TELEPHONE TRAFFIC DATA PROCESSOR

Filed Nov. 8, 1957 7 Sheets-Sheet 1

INVENTORS W. B. CALLAWAY
A. A. DELTUVIA, JR.
BY
ATTORNEY

INVENTORS W. B. CALLAWAY
A. A. DELTUVIA, JR.
BY Donald M Duft
ATTORNEY

INVENTORS W. B. CALLAWAY
A. A. DELTUVIA, JR.
BY Donald M Duft
ATTORNEY

Oct. 20, 1959 W. B. CALLAWAY ET AL 2,909,608

TELEPHONE TRAFFIC DATA PROCESSOR

Filed Nov. 8, 1957 7 Sheets-Sheet 4

INVENTORS W. B. CALLAWAY
A. A. DELTUVIA, JR.
BY Donald M. Duft
ATTORNEY

INVENTORS W. B. CALLAWAY
A. A. DELTUVIA, JR.
BY Donald M Duft
ATTORNEY

Oct. 20, 1959 W. B. CALLAWAY ET AL 2,909,608

TELEPHONE TRAFFIC DATA PROCESSOR

Filed Nov. 8, 1957 7 Sheets-Sheet 6

INVENTORS W. B. CALLAWAY
A. A. DELTUVIA, JR.
BY Donald M Duft
ATTORNEY

Oct. 20, 1959 W. B. CALLAWAY ET AL 2,909,608

TELEPHONE TRAFFIC DATA PROCESSOR

Filed Nov. 8, 1957 7 Sheets-Sheet 7

INVENTORS W. B. CALLAWAY
A. A. DELTUVIA, JR.
BY Donald M Duft
ATTORNEY

United States Patent Office 2,909,608

Patented Oct. 20, 1959

2,909,608

TELEPHONE TRAFFIC DATA PROCESSOR

William B. Callaway, Bloomfield, N.J., and Andrew A. Deltuvia, Jr., Brooklyn, N.Y., assignors to Bell Telephone Laboratories, Incorporated, New York, N.Y., a corporation of New York Application November 8, 1957, Serial No. 695,294

15 Claims. (Cl. 179—8)

This invention relates to a data processing system and more particularly to a data processing system which, in response to the cyclic receipt of information pertaining to the idle or busy condition of a plurality of units, totalizes the number of times each was found busy during a given time interval.

It is a well-known truism that any business concern requiring the use of production or operating facilities should utilize said facilities at the highest maximum average occupancy consistent with economy of operation. This is accomplished only when the optimum number of facilities are furnished for the job to be performed. For example, it obviously would be economically unwise to provide such a large quantity of machinery that all of it would never be used simultaneously except during rarely occurring peak periods of activity. Also, it would be economically unwise to provide such a small quantity of machinery of one type that the remaining facilities would be slowed down because of the small capacity of these few machines.

In the telephone industry the problem of providing optimum service together with economy of operation occurs, for example, in determining the optimum number of communication paths that are to be provided between any two points. It is highly important to any telephone company that it provide neither more nor less paths than are necessary to render adequate service. For example, if a company provides fewer paths than are necessary, the service would be inadequate since many subscribers would receive a busy tone and would be unable to complete their calls without delay. Also, it would be just as unwise to provide such a vast number of paths that most of them would be busy only during some theoretically possible but actually improbable peak load, such as if every subscriber should simultaneously attempt to place a call.

Most telephone systems are designed so that the average occupancy of their equipment is near the 100 percent level only during peak periods that may be reasonably expected to occur. This goal of 100 percent is rarely attained since it is common practice to provide a small margin of reserve equipment in order to provide for unexpected emergencies.

In line with these objectives, it is desirable that frequent studies be made regarding the average occupancy of equipment already in service so that additional equipment may be ordered when it appears that the present facilities are no longer sufficient to give satisfactory service. The equipment used in the past to perform such studies and to furnish this data has not been as satisfactory as desired. An obvious method of deriving such data, and one that has been used in the past, is to attach a time recording device to each unit or machine in the group under study and then periodically compute the desired information from the recorded data. The disadvantage with this method is that the compilation of the data from the recording machines is a laborious process.

Another method used in the prior art involves the use of a resistive network and an ammeter. The resistance of the resistive network is caused to vary in accordance with the percent of occupancy of the group of units or machines, and as the resistance varies, the current through the ammeter can be observed and recorded. The current at any one time will be representative of the number of machines busy at that instant. This method of deriving data is difficult to use in situations where the busy time of the equipment may be in the order of one or two seconds, or less.

The present invention provides a new and improved means of processing data pertaining to the number of times each of a plurality of units was found busy during any desired period of observation. It is equally well suited for use with equipment having a short busy time as with equipment having a long busy period.

Accordingly, it is an object of this invention to facilitate the determination of the number of times each of a plurality of units was found busy during any given interval of time.

It is a further object of the invention to provide a means for recording the number of times each of a plurality of units was found busy during a given time interval.

In the particular embodiment of the invention disclosed herein it is assumed that the plurality of units under study comprises a plurality of telephone lines and/or trunks. However, it is to be understood that this showing is only illustrative and that the present invention could equally well be used where the particular units involved comprise any type of production or operating facilities. Also, in order to avoid repeated use of the cumbersome term "telephone lines and/or trunks," the term "telephone trunks" is used hereinafter. Unless specified to the contrary, this term is to be understood as including all types of transmission paths regardless of their nature.

In practice it has been found that the aforementioned information concerning the average occupancy of a plurality of telephone trunks can best be obtained by a two-step process wherein the first step comprises the repeated and continuous scanning of each trunk to determine whether it is in a busy or idle condition at the time of the scan together with the recording of the results of each scan on a suitable medium such as, for example, magnetic tape. The second step comprises the feeding of the recorded information to a circuit which, in response thereto, records on a suitable medium the number of times each trunk in the group was found busy during the time the group was observed.

The present invention pertains solely to the equipment required for performing the second step in this process. The particular embodiment of the invention disclosed herein comprises an input circuit for receiving the recorded information, a plurality of registers, each of which represents a different trunk in the group under study, together with a suitable circuit which, in response to the input information, selectively operates the registers so that at the end of the processing period, the count on each register indicates the number of times its associated trunk was found busy during the interval of time represented by the data on the tape.

The input circuit of the present invention comprises a pair of magnetic tape reading heads which are designed to receive information from tapes of the general type produced by the system disclosed in the J. K. Middaugh application Serial No. 619,424, filed October 31, 1956, which system cyclically and continuously scans a plurality of trunks in order to ascertain their busy or idle condition. The results of each scan are recorded on a multitrack magnetic tape with a pulse being recorded in a first track (the scan track) each time a trunk is scanned and with a pulse being recorded in a second track (the busy track) each time a trunk is found busy at the time its pulse is recorded in the scan track. The pulses recorded in the scan track are called scan pulses while those in the busy track are called busy pulses. If a trunk is idle when its scan pulse is recorded, no pulse is recorded in the busy track. Thus, a pulse is coincidentally recorded in both tracks whenever its trunk is found busy and is recorded in only the scan track whenever its trunk is found idle.

When processing a tape, the circuit recognizes each coincidence of a pulse in both channels and, in response thereto, operates the register representing the busy trunk. At the end of the tape processing, the readings of the registers provide an indication of how many times each trunk was found busy during the interval of time represented by the tape.

A feature of the invention relates to a means for totalizing the number of times each of a plurality of units was found busy during a given time interval in response to the cyclic receipt of information pertaining to the busy or idle condition of each of said units.

A further feature of the invention relates to a means for totalizing the number of times each of a selected few of a plurality of units was found busy during a given time interval in response to the cyclic receipt of information pertaining to the busy or idle condition of each of said selected few units.

A further feature of the invention relates to the provision of a plurality of registers for totalizing the number of times each of a plurality of units was found busy during a given time interval in response to the receipt of cyclic information pertaining to the busy or idle condition of each unit.

A further feature of the invention relates to the provision of a plurality of registers for totalizing the number of times each of a selected few of a plurality of units was found busy during a given time interval in response to the receipt of cyclic information pertaining to the busy or idle condition of each of said selected few units.

A further feature of the invention relates to a system for totalizing the number of times each of a plurality of units was found busy in response to the receipt of cyclic information wherein the busy condition of a unit is represented by a pair of coincidentally received impulses.

A further feature of the invention relates to the provision of an N number of registers for totalizing the number of times each of an N number of communication paths was found busy during a given time interval in response to the cyclic receipt of information pertaining to the busy or idle condition of each communication path.

A further feature of the invention relates to a system having two input channels for totalizing the number of times each of a plurality of lines was found busy during a given time interval wherein a pulse received by one channel represents an idle condition of a line while pulses coincidentally received by both channels represent a busy condition of a line.

A further feature of the invention relates to a means for totalizing the number of times each of a plurality of units was found busy during a given time interval wherein a plurality of registers is provided, one for each unit in the group under study and wherein each register is operated once each time its related units is found busy.

A further feature of the invention relates to the provision of a distributor having a number of operative positions in a system for totalizing the number of times each of a plurality of lines was found busy during a given time interval wherein a pulse received by only a first channel represents an idle condition of a line and advances the distributor one position while pulses coincidentally received by both said first and second channels represent a busy condition of a line and operate the register associated with the current operative position of the distributor.

These and other features and objects of the invention will become apparent upon consideration of the following description taken in conjunction with the drawings in which:

Figs. 1 through 4 disclose the detailed circuit of one exemplary embodiment of the invention;

Fig. 5 contains a block diagrammatic showing of the embodiment of the invention disclosed in detail in Figs. 1 through 4;

Fig. 6 discloses one possible modification of the embodiment shown in Fig. 5;

Fig. 7 discloses how Figs. 1 through 4 should be arranged with respect to one another;

Fig. 8 discloses the nature of and the relationship between the pulses recorded in each of the two tracks of the tape the present invention is designed to process.

*General description*

The disclosed embodiment of the invention is designed to record data pertaining to a maximum of seventy trunks. Accordingly, it can process tapes having recorded thereon a cyclic series or group of seventy scan pulses with each pulse within a group representing one of the trunks under observation. Each group of seventy scan pulses represents a single test on all of the seventy trunks under observation. During each test, a busy pulse is recorded in the busy track coincidentally with a scan pulse in the scan track whenever the trunk represented by the scan pulse is found busy.

Fig. 8 contains a sample waveform illustrating the type of signals recorded in each track of the input tape. The upper half of Fig. 8 shows two cycles of the signals recorded in the scan track. A reset pulse is recorded in the scan track prior to the initiation of each scanning cycle in order to reset the various counting devices in the circuit to their normal position. The reset pulse is indicated as a large amplitude negative pulse in the upper half of Fig. 8. Following this, a series of seventy positive scan pulses is recorded in this track. Each of these pulses represents an individual trunk in the group of trunks under observation, and each group of seventy pulses represents a single test on the group of trunks under observation.

Following the recording of the last scan pulse in the first cycle, a negative reset pulse is again recorded in the scan track. The second reset pulse indicates the end of the first test and, in the same manner as before, resets all of the counting devices. Following this, another group of seventy positive scan pulses is recorded. This process is repeated each time the group is scanned and therefore, the number of cycles recorded in the scan track indicates the number of times the group of trunks under obeservation was tested.

The waveform in the lower half of Fig. 8 illustrates the type of signals recorded in the busy track at the same time the scan pulses are recorded in the scan track. This waveform represents recorded information pertaining to a group of communication paths comprising both lines and trunks where a positive pulse is recorded for every busy line and a negative pulse for every busy trunk.

Starting at the left, the first positive pulse recorded in the busy track indicates that the line represented by scan pulse 01 was found busy at the time the test represented by the first series of 70 scan pulses was made. The second positive pulse in the busy track similarly indicates that the line represented by scan pulse 03 was found busy during the time this test was made. The next pulse recorded in the scan channel is a negative one and indicates that the trunk represented by scan pulse 04 of the first cycle was found busy at the time this pulse was recorded. Likewise, the third positive pulse indicates a busy condition of the line represented by scan pulse 68 of the first cycle. The fourth positive pulse in the busy track was recorded during the next cycle and indicates that the line represented by scan pulse 01 was still busy when the second test was made. No positive pulse was recorded in the busy track coincidentally with the recording of scan pulse 03 in the second cycle and, therefore, the line represented by this pulse went from a busy to an idle condition between the time the first and second tests were made. Likewise, the trunk represented by scan pulse 04 of the second cycle was idle at this time since no negative pulse was coincidentally recorded in the busy track. The last positive pulse shown in the busy track indicates that the line represented by scan pulse 68 was still busy at the time this test was made.

Fig. 5 contains a block diagrammatic presentation of the circuit disclosed in detail in Figs. 1 through 4. It is believed that a brief description of the system's operation with respect to Fig. 5 will facilitate an understanding of the latter described detailed circuit operations. The circuit represented by each rectangle in Fig. 5 is designated according to its function in the overall system. Adjacent each rectangle in Fig. 5 is an indication of the figure where the circuit represented by it is shown on Figs. 1 through 4. The individual circuits in Figs. 1 through 4 which are represented by the rectangles on Fig. 5 are designated in the same manner as their correlative rectangles.

The system shown on Fig. 5 provides a means for recording on ten registers the busy information for a selected ten out of the seventy lines or trunks comprising the group of circuits under observation. The ten registers are designated –0, –1 . . . –9. The particular ten out of seventy circuits whose results are to be recorded are selected by the position of the rotary switch 271 associated with the decade counter. With switch 271 in position 00, as indicated, the ten registers will record busy information pertaining to lines and trunks 00 through 09. If switch 271 is moved to another position, such as position 4, for example, the registers will then record the same information for circuits 40 through 49.

It has been found that it is desirable to segregate the information pertaining to the busy trunks from that pertaining to busy lines. Switch 216 is provided for this purpose. This switch is operated to its upper position when it is desired to study line circuits and to its lower position when it is desired to record information pertaining to trunk circuits. It will be recalled that the busy line pulses are positive in polarity while the busy trunk pulses are negative in polarity. The trunk busy multivibrator driver provides an extra stage of amplification whereby the busy trunk pulses will apply input signals of the same polarity to the busy multivibrator when switch 216 is in its lower position as do the busy line pulses when switch 216 is in its upper position.

Although the system shown diagrammatically in Fig. 5 and in detail in Figs. 1 through 4 provides a means for registering the busy information for only a selected ten out of seventy circuits, Fig. 6 diagrammatically discloses how the system of Fig. 5 may be modified to provide seventy registers for recording busy information pertaining to all seventy circuits in the group under observation.

Information is fed to the circuit of Fig. 5 by means of a tape recorder having a scan head and a busy head. The scan head, shown in the upper half of Fig. 8, reads the information contained in the scan track of the tape, while the busy head, shown in the lower half of Fig. 8, reads the data recorded in the busy track of the tape. The magnetic recorder on which the scan and busy heads are mounted is not shown on the present drawings since its details comprise no part of the present invention and since it may be any type suitable for the purpose.

As was shown in connection with Fig. 8, the first pulse recorded in the scan channel is a large amplitude negative reset pulse. This pulse is read by the scan head, amplified by the amplifier, and fed to both the reset multivibrator driver and the scan advance multivibrator driver circuits. The scan advance multivibrator driver is designed to amplify only the positive scan pulses and, therefore, the negative reset pulse has no effect upon it. The circuit operation resulting from the reading of the negative reset pulse depends upon the position of switch 173. If this switch is thrown to the right, as indicated in Fig. 5, the reset pulse effects no further circuit actions since the automatic reset multivibrator driver circuit generates a reset pulse on its own, without the aid of the recorded reset pulse, and feeds its output to the reset multivibrator circuit. The reset multivibrator feeds its output to the reset amplifiers which reset the units counter to its position 9 and the decade counter to its position 90. Another output of the reset multivibrator is fed to the busy multivibrator circuit to disable it during the duration of the reset pulse. In the event the automatic reset pulse generator is used, the resetting action is not fully effective until the end of the first scan and therefore, the reset action is not initiated until that time.

If switch 173 is operated to the left, the reset pulse is amplified by the reset multivibrator driver and fed through the switch contacts to the reset multivibrator which, in a manner similar to that already described, resets both the units and decade counters. The reasons governing the position in which switch 173 is set during the processing of a tape are explained in detail hereinafter in connection with the detailed description of the circuit.

The next pulse read by the scan head is the first scan pulse, designated 00 in Figure 8, which is a positive pulse. This pulse is amplified by the preamplifier, amplified and shaped by the scan advance multivibrator driver and scan advance multivibrator circuits and, after leaving the scan advance multivibrator, is applied to the units counter driver circuit. This circuit advances the units counter one position each time a scan pulse is read by the scan head. Therefore, the reading of scan pulse 00 causes the units counter to step from its 9 to its 0 position.

The units counter has ten stepping or operative positions designated 0 through 9 each of which has an output lead associated therewith. Each output lead has an operating potential applied thereto by the counter whenever the counter is in the stepping position associated therewith. Each stepping position of the units counter also has associated therewith an individual cathode follower, an individual thyratron gate, and an individual register. When the counter steps to any operative position and applies an operating potential to the output lead for that position, the cathode follower applies a positive potential to one grid of its related thyratron gate. However, the thyratrons are of the type which require a positive input potential to both grids before they will fire and, therefore, the output from the cathode follower is not sufficient by itself to fire the thyratron gate and operate the register associated therewith.

The operating potential on the output lead for position 0 of the units counter applies a pulse to the input of the decade counter driver to step the decade counter one step from its position 90 to its position 00. This indicates that first ten scan pulses received are associated with circuits 00 through 09 in the group under observation.

The decade counter has seven output positions and applies an operating potential to each output lead when it is in the operative position associated therewith.

When the next scan pulse is read (scan pulse 01 of Fig. 8), it is amplified and shaped in a similar manner and fed to the units counter driver which steps the units counter from its position 0 to position 1. When each succeeding scan pulse is read, it likewise causes the units counter to be advanced one step. Thus, the units counter advances from position 8 to position 9 after ten scan pulses have been read. The reception of the next scan pulse causes the units counter to step from its position 9 to position 0. The output signal from the position 0 is fed to the decade counter driver circuit which steps the decade counter from its 00 to its 10 position thereby indicating that the next ten received pulses are scan pulses 10 through 19.

The circuit operations continue as described with the units counter advancing one step in response to the reception of each scan pulse and with the decade counter advancing one step in response to each cycle of the units counter and, in particular, when it steps from position 9 to position 0.

At the same time, the scan head reads the scan pulses recorded in the scan channel of the tape, the busy head reads whatever pulses are recorded in the busy channel of the tape. Referring back to Fig. 8, it was seen that the first busy pulse received was a positive pulse indicating the busy condition of the line represented by scan pulse 01. This pulse is read by the busy head, amplified by the preamplifier, amplified and shaped by the line busy multivibrator driver, fed through the upper contacts of switch 216 (assuming this switch is in its upper position), amplified and shaped by the busy multivibrator, and fed to the busy gate circuit. The busy gate comprises an "and" type gate which requires two coincidental inputs to produce a single output.

At the same time the busy pulse for line 01 is received at one input of the busy gate, the decade counter is in position 00 and, therefore, the output lead from this position now applies a positive potential to the second input of the busy gate (assuming switch 271 is in its 00 position). The coincidence of the output potential from position 00 of the decade counter and the output pulse from the busy multivibrator causes the busy gate to apply an outward pulse to one input of each of the gas thyratron gates. As has been described, at the time the scanning pulse representing line 01 is read, the units counter is in its position 1 which, by means of its associated cathode follower, applies an output signal to one input of the thyratron gate associated with register –1. This register now represents line 01 since switch 271 is in position 00. Therefore, the output from the busy gate is applied to the one input of all the gas thyratron gates at the same time the cathode follower for position 1 of the units counter applies a potential to the other input of its thyratron gate. Only the thyratron gate associated with position 1 fires and operates its register since it is the only gate whose two inputs are energized at this time.

The busy pulse associated with line 03 similarly causes the operation of register –3 when it is read. The negative pulse representing a busy condition of trunk 04 has no effect upon the circuit since switch 216 is in its upper position. When in this position, the circuit only records busy information pertaining to line since the busy pulses for trunks are of the opposite polarity and hence, cannot operate the busy multivibrator. Switch 216 is moved to its lower position when it is desired to record busy data for trunks.

Later, the busy pulse representing line 68 is read and fed to one input of the busy gate circuit. However, since switch 271 is in its 00 position, the output from position 60 of the decade counter cannot be applied to the other input of the busy gate and, therefore, none of the registers can be operated.

After the seventy scan pulses comprising the first cycle have been received, a negative reset pulse is read by the scan head. This pulse resets the units counter to its 9 position and the decade counter to its position 90 in a manner similar to that already described.

At this time, both of counters –1 and –3 have been operated to indicate that lines 01 and 03 were found busy during the first test. The busy condition of line 68 and trunk 04 was not recorded in the registers because of the settings of switches 271 and 216.

Line 01 was also found busy during the second test. The reception of its busy pulse when the units counter is in its position 1 and the decade counter in its position 00 effects the operation of register –1 as before described. The busy pulse associated with line 68 is read and is fed to one input of the busy gate which is not enabled at this time because of the position of switch 271 and, therefore, no message register operates.

The circuit operations proceed as above described and, when the processing of the tape is completed, the settings of the ten registers will represent the number of times all of lines 00 through 09 were found busy. With the embodiment of Fig. 5, switch 271 or 216 must be operated to a different position and the tape rerun through the machine if information is also desired for any circuits other than 00 through 09 or for any trunks.

*Detailed description*

Figure 1:
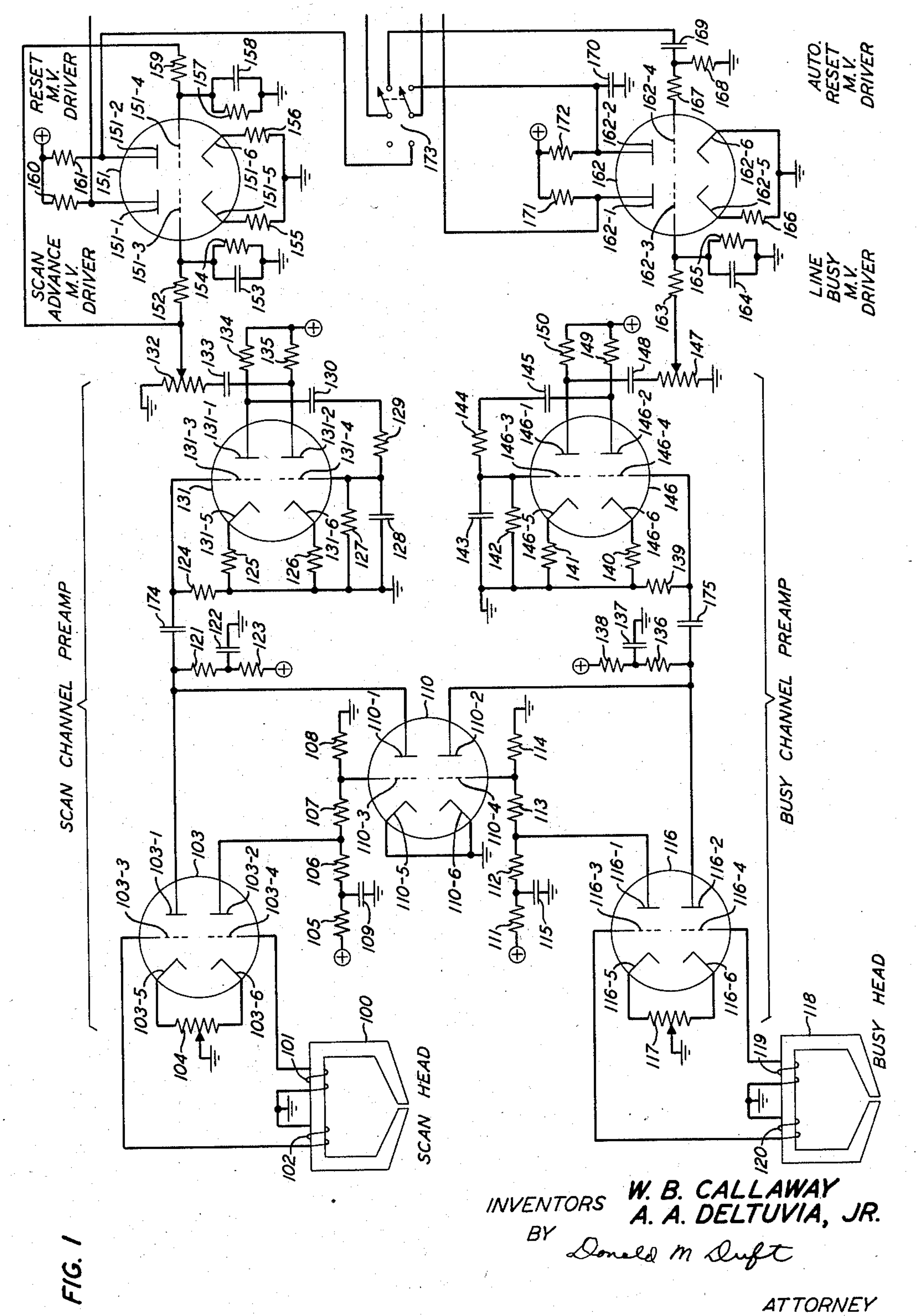

The preamplifier for the scan channel includes both halves of dual triodes 103 and 131 together with the upper half of dual triode 110. This circuit comprises a preamplifier having extremely high gain and, therefore, a push-pull input is used in order to minimize hum pickup. The center tap of coils 101 and 102 of the scan head 100 is grounded and one end of each winding is connected to one of the grids of tube 103. Potentiometer 104 provides a biasing means for the tube and is adjusted so that the gain of the upper triode of tube 103 equals the gain of the lower triode of tube 103 plus the gain of the upper triode of tube 110. The output from plate 103–1 is fed through condenser 174 to grid 131–3 of tube 131 while the output of plate 103–2 is fed through the upper half of triode 110 and then through condenser 174 to grid 131–3. The use of a preamplifier having a push-pull input circuit and a single ended output circuit provides a means for canceling out any longitudinal hum pickup, i.e., hum pickup signals which produce in-phase voltages on both grids of triode 103.

In order to explain the action of the longitudinal hum canceling circuit it will be assumed that the longitudinal pickup at a given instance is of negative polarity. The induced hum voltage, therefore, is of negative polarity on both grids of tube 103. The negative signal on both grids results in a positive signal on both plates 103–1 and 103–2. The positive signal on plate 103–1 tends to drive grid 131–3 positive since there is a direct connection signal-wise between the two. However, the positive signal on plate 103–2 is fed through resistor 107 to grid 110–3 of tube 110. The positive signal on this grid results in a negative signal on plate 110–1 which is connected through condenser 174 to grid 131–3. Therefore, if the circuit comprising the lower half of triode 103 together with the upper half of triode 110 has a gain equal to the upper half of triode 103 alone, it is easily seen that the positive signal impressed on grid 131–3 by plate 103–1 will be completely cancelled by the negative signal impressed on the same grid by plate 110–1. The result is that any longitudinal hum voltage on the two input grids 103–3 and 103–4 will not be impressed on grid 131–3. This arrangement allows the amplifier to have a push-pull input and a single ended output. The recorded signals read by the pickup heads and impressed on the grids of triode 103 are out-of-phase with respect to each other on the two input grids so that when they combine on grid 131–3 they are in phase and aid each other.

The upper half of triode 131 comprises a conventional amplifier which feeds its output from plate 131–1, through condenser 130 and resistor 129, to grid 131–4 of the lower half of the same tube. The lower half of tube 131 together with condenser 128 and the other circuit elements comprises an integrator circuit which compensates for the inherent differentiation charactristics of the magnetic head, thereby insuring that the output signals on plate 131–2 are faithful reproductions of the square waves recorded on the tape.

The busy channel preamplifier is identical with the scan channel preamplifier except for the fact that the upper half of triode 146 is connected as a straight amplifier and not as an integrator. Therefore, the output signals from this circuit are the differential of the pulses recorded in the busy channel of the tape. As is described later, the differentiation of the busy pulses caused by the inherent characteristics of the pickup head is used to correct for the difference in time of arrival between the scan pulses and the busy pulses on the grids of the gas thyratrons. This time difference results from the fact that the scan and the busy pulses have different paths of travel through their respective circuits before they arrive at the grids of the gas thyratrons.

Once the processing of a tape has begun, the first pulse received is a negative reset pulse. This pulse is amplified by the scan channel preamplifier and is fed from the output of the integrator on plate 131–2 through condenser 133 and resistor 132 to ground. A portion of the signal developed across resistor 132 is fed through resistor 159 to the grid 151–4 of the reset multivibrator driver. This same signal is also fed through resistor 152 to grid 151–3 of the scan advance multivibrator driver. However, the reset signal applied to grid 151–3 has no effect upon circuit operations as is later described and, therefore, only the circuit actions resulting from the application of this signal to grid 151–4 need be considered.

The polarity of the reset pulse appearing on the output of the integrator at plate 131–2 is positive. This pulse is applied through resistor 159 to grid 151–4 and, therefore, appears as a negative pulse on plate 151–2. This negative pulse is applied through the lower left-hand contacts of switch 173 (assuming this switch is on its left-hand position wherein the reset circuits are responsive to the recorded reset pulses on the tape), through condenser 231 to grid 230–3 of the left-hand triode of tube 230. This tube, together with the circuit elements associated therewith, comprises a monostable multivibrator. The potentiometer 234 is adjusted so that the left-hand triode is normally conducting while the right-hand triode is normally cut-off. The negative reset pulse applied to grid 230–3 causes the multivibrator to flip to its other operating state wherein the left-hand triode is cut-off while the right-hand triode is conducting. The circuit remains in this condition only momentarily and then returns to its normal state with the left-hand triode conducting and the right-hand triode cut-off.

The positive square wave appearing on plate 230–1, as a result of this triode going from a conducting state, to a cut-off state, and then back to a conducting state, is applied through condenser 241, resistor 242, resistor 245, to grid 247–3 as well as through resistor 242 and resistor 246 to the grid 247–4. Tube 247, together with its accompanying circuit elements, comprises a pair of cathode followers which reset the counter tubes to their normal position upon the application of the positive reset pulse to grids 247–3 and 247–4.

Before proceeding further with the circuit description, a brief description of counter tubes 317 and 449 will be helpful. These tubes are commercially identified as the Etelco company model GS10C glow transfer counter tube. They are in widespread commercial use both in this country as well as in England.

Each tube has an anode A, a plurality of stepping cathodes, designated 0 through 9, arranged in a circular array with a pair of transfer cathodes, designated S1 and S2, interposed between each pair of stepping cathodes. The tube may maintain conduction from any one of its cathodes to its anode. The conductive position within the tube is transferred from one stepping cathode to the next by applying certain potentials to the transfer cathodes adjacent the one that is conducting. Assume that tube 317 is currently conducting between cathode 0 and anode A. A positive pulse is applied to transfer cathode S2 and a negative pulse to transfer cathode S1 to cause the conductive position to transfer from cathode 0 to cathode 1. When it is desired to step the conductive position from cathode 1 to cathode 2, a negative pulse is again applied to transfer cathode S1 while a positive pulse is applied to transfer cathode S2. The operation continues in this manner with the conductive path in the tube stepping from position to position upon each application of stepping pulses to the transfer cathodes.

Each tube is reset to its ninth or normal position by applying a positive pulse to all the stepping cathodes except that in the ninth position. This causes the discharge to transfer to this position because the potential difference between it and the anode is then larger than that between the anode and the other stepping cathodes. Referring to tube 317, it may be seen that stepping cathodes 0 through 8 are connected by means of resistors 319 through 327 to ground through a pair of series connected resistors 301 and 303 of which resistor 301 is normally short circuited by switch 300. Resistors 301 and 303 also comprise the cathode resistors for cathode 247–6. Therefore, a large amplitude positive pulse appears across resistors 301 and 303 when the right-hand triode of tube 247 conduits heavily upon the application of the positive reset pulse to grid 247–4. The positive pulse appearing across resistors 301 and 303 drives cathodes 0 through 8 to a high positive potential for the duration of the reset pulse. This casues the discharge to step to the cathode of the ninth position, which is connected to ground through resistor 328, since the potential difference between it and the anode is much larger than that between the anode and any of the other stepping cathodes.

Cathodes 0 through 8 of decade counter tube 449 are connected by means of resistors 460 and 451 through 458 to ground through a pair of series connected resistors 461 and 463 of which resistor 461 is normally shorted by the contacts of key 300. Resistors 461 and 463 also comprise the circuit to ground for cathode 247–5 of the left-hand cathode follower in tube 247. Stepping cathode 9 is connected directly to ground by means of resistor 459. In a similar manner as has been explained in connection with the units counter tube, the positive reset pulse appearing on grid 247–3 causes its triode to conduct and impress a positive pulse across resistors 461 and 463. This positive pulse is applied to all of stepping cathodes 0 through 8 of the decade counter tube and causes the conductive path within the tube to return to the ninth cathode since the potential difference between the anode and the ninth cathode at that time is much greater than that between the anode and any of stepping cathodes 0 through 8 which remain at a high positive potential for the duration of the reset pulse.

Key 300 provides a means whereby the units and decade counter tubes can manually be reset to their normal positions. When key 300 is in its normal position as shown on Fig. 3, a circuit is completed from a positive potential through resistor 316, through the upper key contacts and through resistor 303 to ground. A similar circuit may be traced from a positive potential through resistor 448, through the lower contacts of key 300, through resistor 463 to ground. The resistance of resistors 303 and 463 is much lower than that of resistors 316 and 448. Therefore, the voltage drop developed across resistors 303 and 463 is of a negligible value and has no effect upon the stepping cathodes of the counter tubes to which they are connected. The opening of key 300 to reset each tube removes the shunt from resistors 301 and 461, each of which is appreciably larger than resistors 303 and 463. The voltage drop now developed across the series combination of resistors 301 and 303 and the series combination of resistors 461 and 463 is sufficient to place a high positive potential on the stepping cathodes to which each is connected, thereby restoring the tubes to their normal conductive position in a manner similar to that already described in connection with the cathode follower 247.

Figure 3:
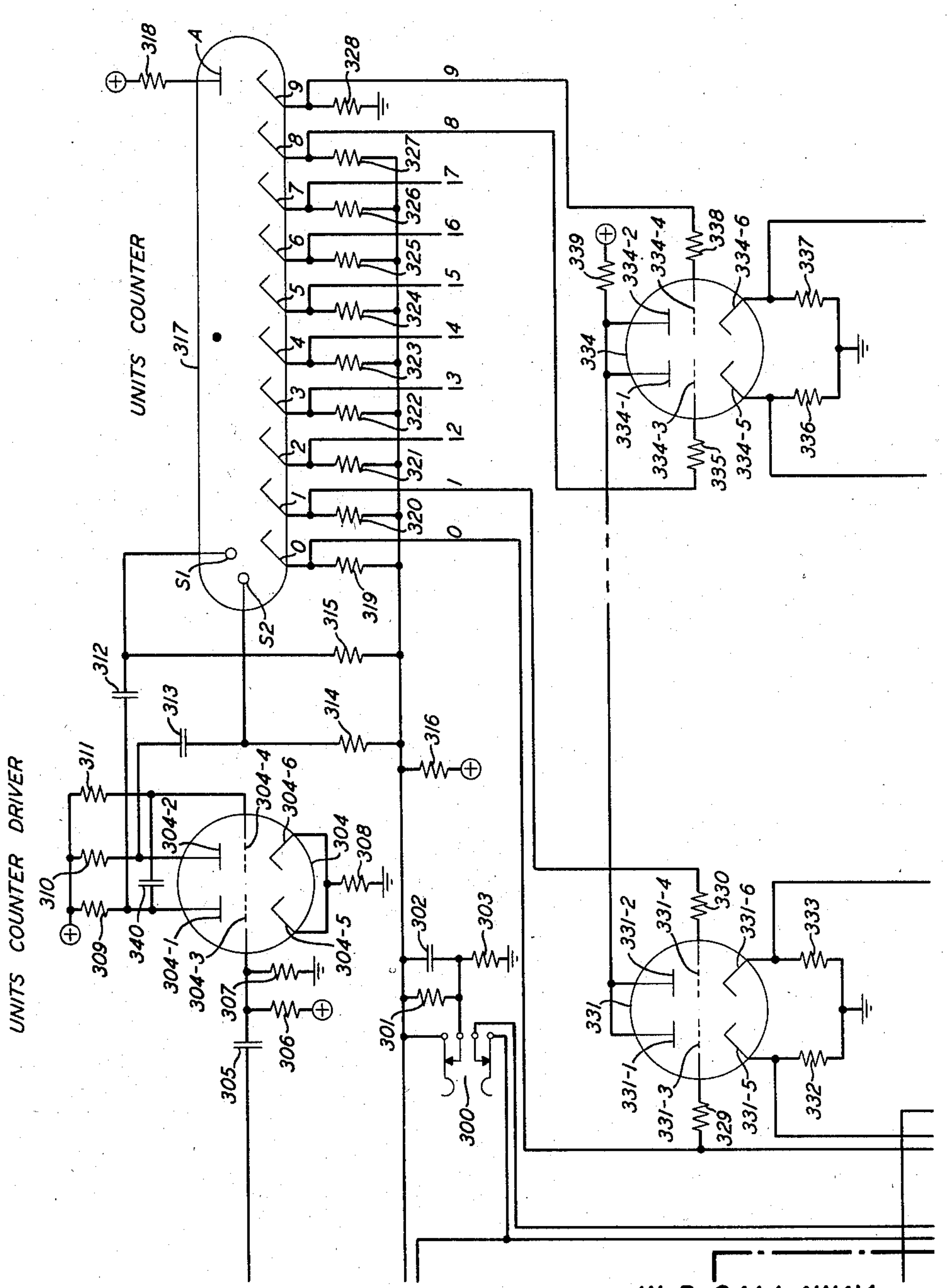

Each of cathodes 0 through 9 of the units counter tube is connected through a resistor to the grid of a related cathode follower of which four are shown in detail on Fig. 3. For example, cathode 0 is connected over lead 0, through resistor 329, to grid 331–3 of the cathode follower comprising the left-hand triode of tube 331. Likewise, stepping cathode 1 is connected over a similar circuit to the right-hand triode of tube 331 while stepping cathodes 8 and 9 are connected to the cathode follower comprising the left- and right-hand triodes, respectively, of tube 334.

The output of each cathode follower is connected to one grid of a dual grid thyratron. Thus, the output of the cathode follower comprising the left-hand triode of tube 331 is connected through condenser 403 and resistor 402 to grid 400–3 of thyratron 400. The other cathode followers of Fig. 3 are connected by similar circuits to their associated thyratrons on Fig. 4. The plate circuit of each thyratron contains a message register which operates once each time the thyratron is energized and, upon its operation, opens a make contact to ground which extinguishes its thyratron.

Figure 4:
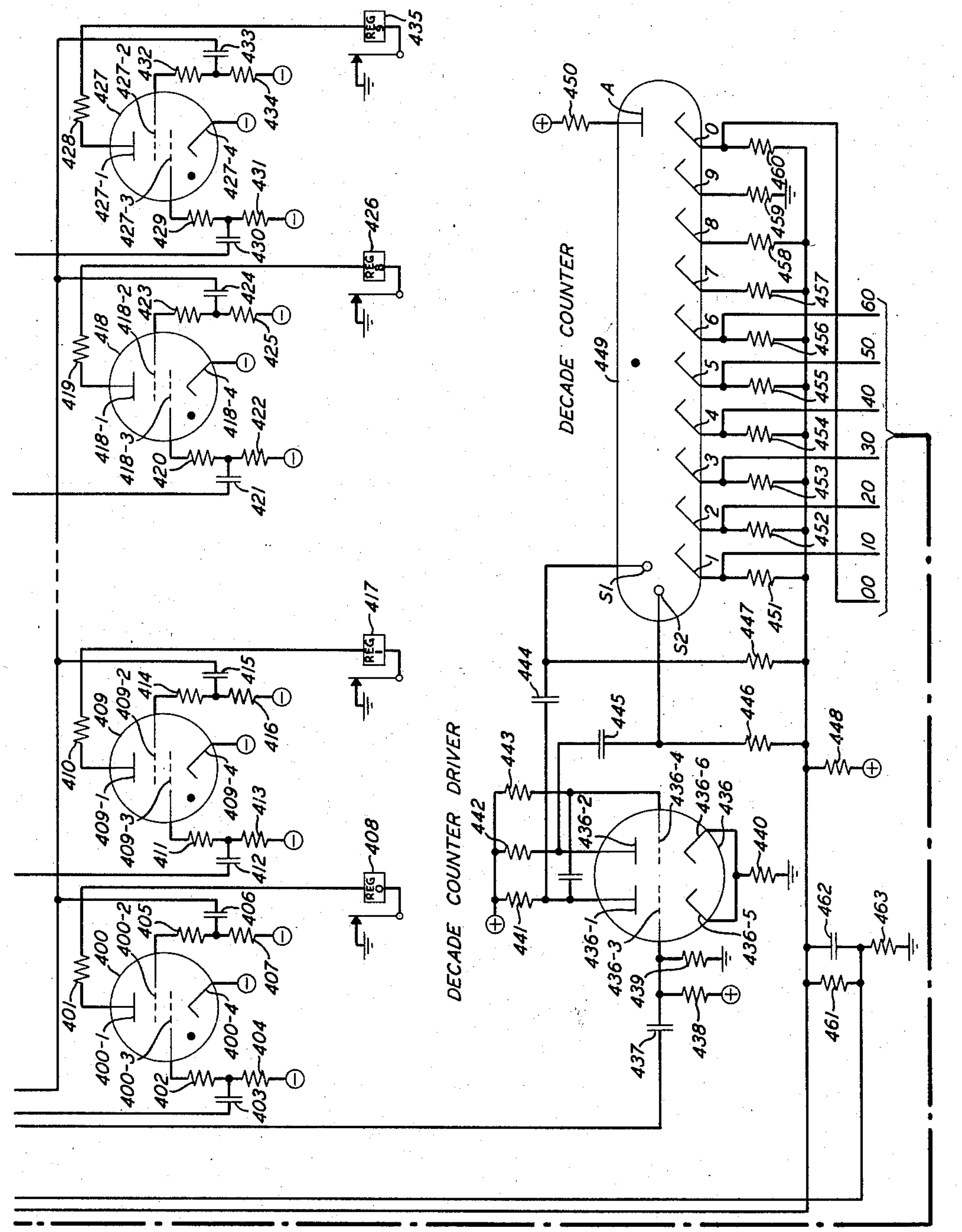

Referring back to the units counter tube 317, each stepping cathode 0 through 9 is near ground potential except when the conductive path in the tube is in its position. The potential on a particular stepping cathode rises abruptly from near ground potential to a high positive potential as the conductive path steps to its position. Therefore, when the conductive path within the tube advances to a particular stepping cathode, such as cathode 0, for example, the high positive potential developed across resistor 319 is applied through resistor 329 to grid 331–3. The positive potential now applied to this grid causes its cathode follower to conduct heavily and apply a positive pulse from cathode 331–5 through condenser 403 and resistor 402 to grid 400–3 of thyratron 400. The positive potential now applied to grid 400–3 is insufficient by itself to fire the tube, since the thyratrons shown on Fig. 4 are of the type wherein a positive potential must be placed on both grids before they will fire.

The outputs from cathodes 0 through 6 of the decade counter tube 449 are applied over leads 00, 10, 20, 30, 40, 50, and 60 to contacts on switch 271. The position of switch 271 determines which ten out of the seventy lines are to be associated with the ten registers so that the busy data for these ten lines may be recorded on the registers as a tape is processed. The position of switch 271 determines which stepping cathode of the decade counter tube can apply at operating potential through resistor 270 to grid 265–4 of tube 265.

Stepping cathodes 7 and 8 have no output wires connected to them since the present disclosure assumes that the tapes processed by the present circuit contain information for a maximum of seventy circuits.

The next pulse read by scan head, after the reset pulse, is the scan pulse for the first circuit under observation, line 00. All scan pulses are of positive polarity and are therefore easily distinguishable from the negative reset pulse. After passing through the scan channel preamplifier, the pulse is of negative polarity on plate 131–2. This negative pulse is applied through condenser 133 and resistor 132 to ground. That portion of the signal appearing across the movable tap on resistor 132 impresses a negative pulse on grid 151–3 through resistor 152. The pulse is then amplified in the left-hand triode of tube 151 and appears as a positive pulse on plate 151–1. This pulse is applied from plate 151–1 through condenser 202 to grid 207–3 of the scan advance multivibrator. This multivibrator is of the monostable type and the potentiometer 205 is adjusted so that the right-hand triode is normally conducting while the left-hand triode is shut off. The positive scan pulse on grid 207–1 triggers the multivibrator to its other state so that the left-hand triode conducts heavily for the duration of the scan pulse. The circuit reverts to its normal condition with the right-hand triode conducting and the left-hand triode cut off upon the termination of the scan pulse. Resistors 203, 204, 205 provide a means of adjusting the bias on the left-hand triode so that grid 207–3 is negative with respect to its cathode 207–5 which has a bias applied thereto by means of resistors 208 and 209.

The positive square wave appearing on plate 207–2, in response to the reception of a scan pulse, is impressed upon a voltage divider comprising resistors 200 and 201 connected in series to ground. The reduced signal appearing across resistor 200 is applied through condenser 305 to grid 304–3 of the units counter driver. Grid 304–3 is biased at the proper potential with reference to its cathode 304–5 by means of resistors 306 and 307. The positive pulse applied to this grid causes an amplified negative pulse to appear on plate 304–1. This negative pulse is applied through condenser 312 to the transfer cathodes S1. The negative pulse on plate 304–1 is also applied through condenser 340 to grid 304–4 which is supplied with the proper bias relative to its cathode by means of resistor 311. The negative pulse on grid 304–4 causes plate 304–2 to apply an amplified positive pulse through condenser 313 to transfer cathodes S2.

Therefore, the reading of the first scan pulse effects the application of a positive pulse on grid 304–3 of the units counter driver which, in turn, causes a negative pulse to be applied to transfer cathodes S1 and a positive pulse to transfer cathodes S2. The transfer cathodes S1 are positioned immediately after each stepping cathode while the transfer cathodes S2 are positioned immediately before each stepping cathode. The negative transfer pulse applied to cathodes S1 tends to pull the conductive path forward from the conducting stepping cathode while the positive transfer pulse applied to cathodes S2 tends to push the conductive path forward from the conducting stepping cathode. These two effects aid one another so that the conductive path advances one position for each set of transfer pulses applied to cathodes S1 and S2.

It has previously been described how the conductive path in the tube was returned to stepping cathode 9 upon the reading of the reset pulse. Therefore, the negative transfer pulse applied to the transfer cathode S1 immediately following stepping cathode 9 and the positive transfer pulse applied to the transfer cathode S2 immediately preceding stepping cathode 9 cause the conductive path in the tube to advance and transfer to stepping cathode 0 upon the termination of the transfer pulses.

The positive potential developed across resistor 319 at this time is applied through condenser 437 to grid 436–3 of the decade counter driver circuit. This circuit is similar to the units counter driver circuit and, in a like manner, causes the conductive path in the decade counter tube to advance one position for each positive pulse applied to grid 436–3. Since the negative reset pulse left the decade counter tube conducting through its ninth cathode, the positive pulse developed across the cathode resistor 319 causes the decade counter driver to advance the conductive path of the decade counter tube one position to its 0 cathode. Thus, the reading of the first scan pulse causes the units counter and the decade counter to each advance from their ninth to their 0 position, thereby indicating that the scan pulse for line 00 has just been read.

The positive potential developed across resistor 460 at this time is applied over lead 00 to switch 271. Assuming that switch 271 is in position 00 in order that the data for lines 00 through 09 may be recorded, the potential from stepping cathode 0 is then applied through resistor 270 to grid 265–4. Tube 265 is of the type which requires a positive signal on both grids 265–4 and 265–2 before it will conduct. Therefore, the positive potential on grid 265–4 does not fire the tube at this time unless grid 265–2 also has a positive potential applied thereto.

The positive potential developed across resistor 319 of cathode 0 of the units counter tube is also applied through resistor 329 to grid 331–3 of cathode follower 331. This positive pulse on the grid causes the cathode follower to conduct heavily and to apply a positive pulse through condenser 403 and resistor 402 to grid 400–3 of thyratron 400.

Figure 8:
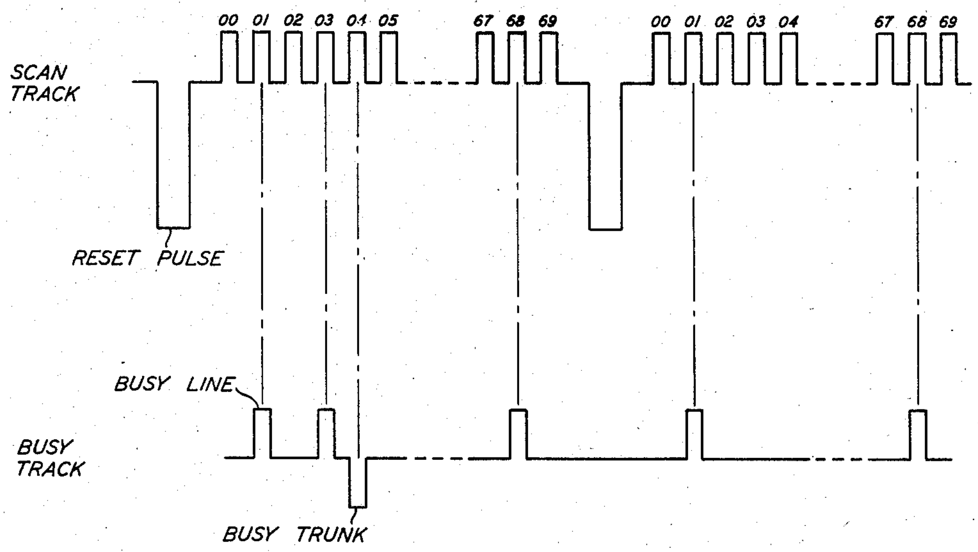

It was assumed, as shown on Fig. 8, that the first line scanned, line 00, was idle and therefore, tube 265 does not conduct and no further circuit actions take place at this time. When the next scan pulse is read, the scan pulse for line 01, the units counter driver applies a pair of transfer potentials to the units counter tube thereby advancing the conductive path therein one step to cathode 1 in a manner similar to that already described in connection with the reading of the scan pulse for line 00. Since line 01 has been assumed to be busy at this time, the busy head reads the recorded busy pulse for line 01 at the same time the scan pulse for this line is read. This busy pulse is amplified by the busy channel preamplifier comprising both halves of tube 116, the lower triode of tube 110, and both triodes of tube 146. Tube 146 is connected as a straight amplifier, instead of an integrator as is tube 131, and therefore, the output of the preamplifier on plate 146–1 is the differential of the busy pulse read by the busy head. The output pulse is of negative polarity on plate 146–1. A portion of this signal is developed across potentiometer 147 and is fed through resistor 163 to the grid 162–3 of tube 162.

This signal is amplified and appears as a positive pulse on plate 162–1. This positive pulse is applied through switch 216, which is in its upper position in order to condition the circuit for the recording of busy line data instead of busy trunk data, through condenser 248 to grid 253–3 of tube 253 which is connected as a monostable multivibrator and which is similar in many respects to the monostable multivibrator comprising tube 207 together with its accompanying circuit. The bias on the left-hand triode of tube 253 is adjusted so that the left-hand triode is normally cut off while the right-hand triode is conducting. This adjustment is made by means of resistors 250, 251, 249, 254 and 255 so that the bias on grid 253–3 is negative with respect to cathode 253–5.

The positive pulse applied to grid 253–3 causes the left-hand triode to conduct heavily and causes the right-hand triode to be cut off. This condition persists for only a short interval of time, as determined by the duration of the input pulse on grid 253–3, after which the circuit returns to its normal position with the left-hand triode cut off and the right-hand triode conducting.

A positive square wave is generated on plate 253–2 as the right-hand triode goes from a conducting state to cut off and then back to a conducting state upon the application of the busy pulse to grid 253–3. The positive pulse on plate 253–2 is applied through resistor 264 to grid 265–2 of tube 265. Tube 265 comprises the busy gate circuit and is of the type in which either grid 265–2 or grid 265–4 can cut off the plate current. When a positive pulse appears on both of these grids simultaneously, a voltage drop occurs across inductance 268 in the cathode circuit. An inductance is used in order to provide a maximum signal output upon the coincidence of a positive signal on both grids.. Potentiometer 269 provides a means for adjusting the bias. Diode 262 is inserted in the grid circuit in order to prevent the grid from assuming a negative potential as a result of its tendency to draw grid current as a series of closely spaced positive pulses are applied thereto.

The busy pulse for line 01 causes this positive pulse to be applied to grid 265–2 at the same time that cathode 0 of the decade counter tube applies a positive potential over lead 00, through contacts 00 of switch 271, through resistor 270 to grid 265–4. The coincidental application of these potentials to grids 265–2 and 265–4 causes tube 265 to conduct heavily and develop a large amplitude positive pulse across inductance 268. This pulse is applied through condenser 415 and resistor 414 to grid 409–2 of thyratron 409. The same pulse is applied through similar condenser and resistor networks to the corresponding grids of all the other thyratron gates.

This pulse is applied to grid 409–2 at the same time that a positive pulse is applied from cathode 1 of the units counter tube through resistor 330 to grid 331–4 which causes its cathode follower to conduct and apply a positive pulse through condenser 412 and resistor 411 to grid 409–3. The coincidental application of a positive pulse on both of grids 409–3 and 409–2 causes the thyratron to fire and operate the register in its plate circuit. The register has a break contact in series therewith which now opens to break the plate circuit of the thyratron and extinguishes the tube.

Although the positive pulse appearing across inductance 268 is applied to all of the thyratron gates, only thyratron 409 fires, since it is the only one having a positive potential on both of its grids at this time.

The units counter tube is advanced one position to cathode 2 upon the reading of the next scan pulse. Line 02 has been shown not to be busy at this time in Fig. 8 and therefore, no busy pulse now read by the busy head. Therefore, the thyratron gate associated with cathode 2 of the units counter tube cannot fire at this time since the busy gate 265 is not opened and does not apply a positive pulse to the grids of the thyratron gates.

Line 03 has been shown to be busy during the first scanning cycle in Fig. 8. Therefore, the reading of the scan pulse and busy pulse for this line advances the conductive path within the units counter to cathode 3 and causes the register associated with cathode 3 to be operated in a manner similar to that described in connection with line 01.

The reading of the scan pulse for trunk 04 advances the units counter tube to its fourth position. The reading of the busy pulse for trunk 04, which is of a negative instead of a positive polarity, causes a negative instead of a positive pulse to be applied to the input grid 253–3 of the busy multivibrator. This negative pulse is of no effect upon the circuit since, it will be recalled, the left-hand triode of this tube is normally cut off. As a result, the busy multivibrator does not respond to this negative pulse, the busy gate 265 remains unopened, and the register associated with trunk 04 does not respond to the reading of the busy trunk pulse.

During the reading of the next five scan pulses the conductive path in the units counter tube advances from cathode 4 to cathode 9. No registers are operated since it has been assumed that none of the lines represented by these pulses were found busy at this time.

The conductive path in the decade counter tube remains on cathode 0 as the units counter tube advances from its zero to its ninth position. The busy gate, therefore, had a positive potential on its grid 265–4 during the time that the units counter tube stepped from position 0 to position 9. As a result, any busy pulses received by the busy gate and representing busy lines during this time open the busy gate and cause the proper registers to operate.

When the next scan pulse, the eleventh, is read it causes the conductive path in the units counter tube to advance from its ninth to its zero position. The positive potential developed on cathode 0 of the units counter at this time energizes the decade counter driver 436 which advances the conductive path in the decade counter tube one position, from cathode 0 to cathode 1. The positive potential now developed across cathode resistor 451 is applied over lead 10 to position 10 of switch 271. However, since switch 271 is in position 00, the potential on position 10 does not apply a positive potential to grid 265–4 of the busy gate so as to enable it to open upon the reception of busy pulses for any of lines 10 through 19. Similarly, none of switch positions 20 . . .

60 can open the busy gate and, hence the registers will be unresponsive to the reception of recorded busy pulses for any of lines 10 through 69.

The operation continues in a similar manner with the path within the units counter tube advancing one position as each scan pulse read and with the path within the decade counter tube advancing one position for every cycle of the units counter, i.e., as the units counter advances from its ninth to its zero position.

The last scan pulse in the first scan cycle represents line 69. After this pulse is received, the units counter tube is in its ninth position while the decade counter tube is in its sixth position. Following the reading of this pulse, the negative reset pulse is read by the scan head. This pulse effects circuit operations similar to that already described in connection with the first reset pulse and causes the conductive path in the decade counter to be positioned on cathode 9. Under normal circumstances the units counter tube would already be in its ninth position and, therefore, the negative reset pulse would have no effect upon it. However, if for some reason, such as a defect in the tape, the units counter tube is in a position other than its ninth, the reset pulse will also reposition the conductive path therein to the ninth cathode.

The seventy scan pulses comprising the next scanning cycle are read following the reading of the negative reset pulse. During this time, the units and decade counter tubes operate and, together with the busy gate 265, provide a means whereby any busy pulses representing the first ten lines may energize the thyratron gates and cause the operation of the proper registers.

Circuit operations continue in this manner until all of the data on the tape has been read. The settings of the registers at this time provide an indication of how may times each of the lines 00 . . . 09 were found busy during the interval of time represented by the data on the tape. This information is later used in whatever manner may be desired to enable a determination to be made as to whether or not the optimum number of communication paths are provided.

The circuit operations just described recorded data only for lines 00 through 09, since switch 271 was in position 0. If it is next desired to obtain similar information for lines 10 through 19, or for any other set of ten lines, switch 271 may be rotated to the proper position and the tape rerun in order to obtain the desired information for the other lines. If it is desired to obtain this information for all seventy lines, the tape would have to be rerun seven times with the switch 271 advanced one position each time.

Switch 216 is operated to its lower position when it is desired to record data for busy trunks. This operation of the switch merely inserts an additional stage of amplification comprising tube 217 which inverts the polarity of the signal normally applied to the busy multivibrator 253 and enables the negative busy trunk pulses to apply a positive pulse to the busy multivibrator in the same manner as the positive busy line pulses do when switch 216 is in its upper position.

Switch 173 provides a means of determining whether the recorded negative reset pulses are to be used to reset the counter tubes or whether the automatic reset multivibrator driver circuit should be used for this purpose. Given ideal conditions, the automatic reset multivibrator driver circuit should not be necessary since the recorded reset pulses could provide the necessary resetting action. However, in practice it has been found that some tapes have the reset pulses obliterated or missing entirely and therefore this circuit was developed in order to provide the necessary resetting action when such tapes are encountered.

Switch 173 is operated to its right-hand position when this circuit is to be used. The large amplitude positive scan pulses appearing on plate 207–2 of the scan advance multivibrator are applied through the upper right-hand contacts of switch 173, through condenser 169 and resistor 167 to grid 162–4 of the right-hand triode of tube 162. This triode has 0 bias on it during idle conditions. However, when the positive scan pulses are applied to its grid, the resulting grid current causes the grid to be held at a negative potential, thereby keeping the plate current at a low value. This condition persists as long as the scanning pulses are applied to the grid, i.e., for the duration of a scan cycle. When these positive pulses cease, the grid quickly returns to a zero potential which causes an abrupt rise in the plate current and a sharp dip in the plate voltage. The negative pulse developed on plate 162–2 is applied through the lower right-hand contacts of switch 173, through condenser 231 to grid 230–3 of the reset multivibrator. The reset multivibrator responds to this negative pulse as if it were received from the reading of the recorded reset pulse and causes the counter tubes to be reset in the manner hereinbefore described.

When the counter tubes are reset, a positive potential is applied to all but one of the stepping cathodes in each counter tube. The cathodes of the units counter tube are connected by cathode followers, shown on the lower portion of Fig. 3, to the grids of the gas thyratron shown on the upper half of Fig. 4. Therefore, one grid of each thyratron has a positive pulse thereon during the reset interval. The positive reset potential now on the stepping cathodes of the decade counter tube is applied through switch 271 to grid 265–4 of the busy gate. Therefore, the busy gate is also partially enabled during the duration of the reset pulse. This condition is undesirable since any noise pulses appearing in the busy channel of the tape at this time would open the busy gate and cause it to apply a positive pulse to the grids of each thyratron gate and thereby cause the whole bank of thyratrons to fire and operate the registers.

This undesirable condition is avoided by feeding the negative pulse appearing on plate 230–2 of the reset multivibrator through condenser 227, resistor 226, through condenser 248 to grid 253–3 of the busy multivibrator. This negative square wave persists as long as the reset pulse and maintains the grid of the busy multivibrator at a high negative potential during the reset interval. With this negative potential on its grid, any noise pulses received from the busy head at this time would not be sufficient in amplitude to operate the busy multivibrator. With no output from the busy multivibrator, the busy gate 265 cannot open and the thyratron gates and registers will not be able to operate.

Figure 2:
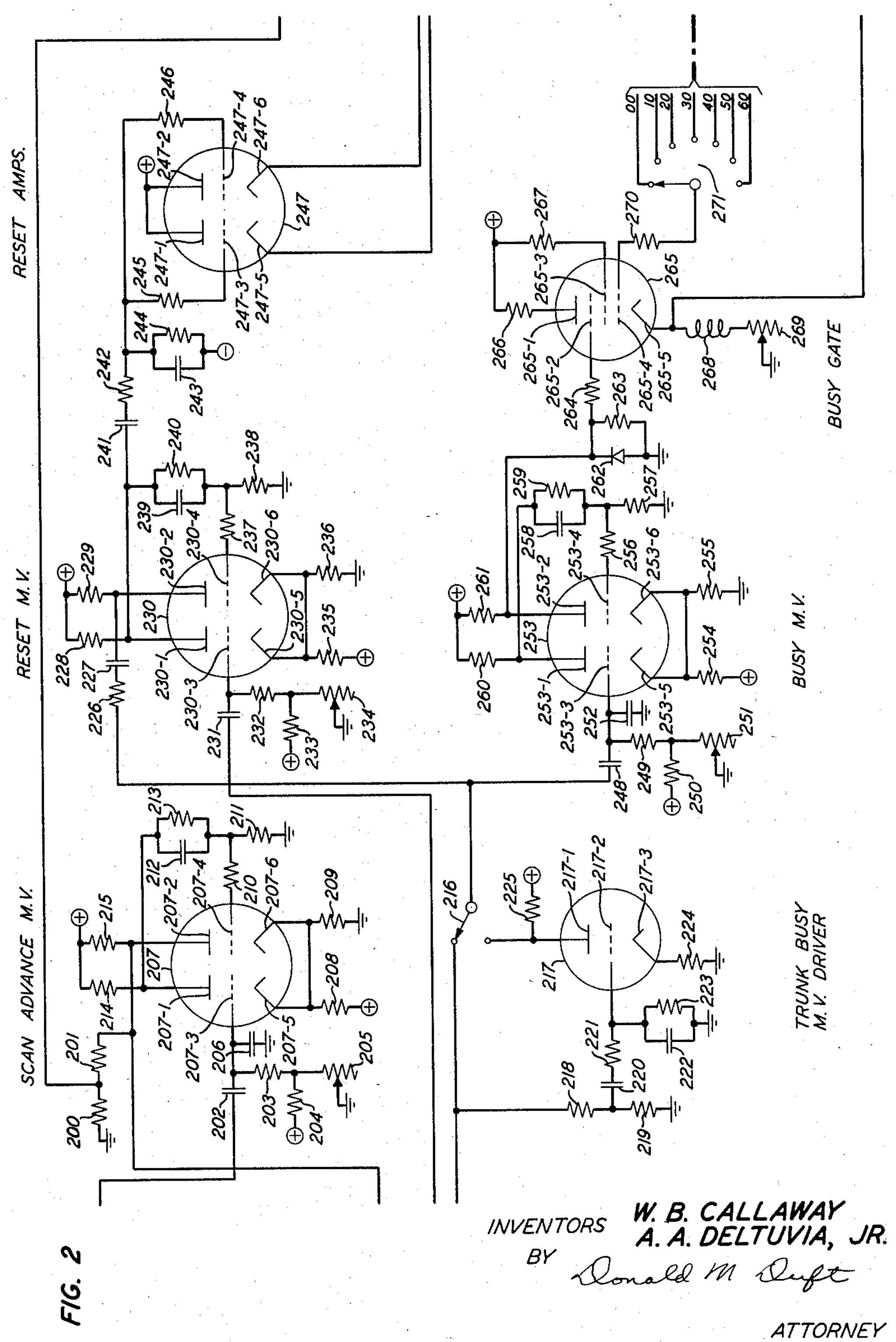
Figure 6:
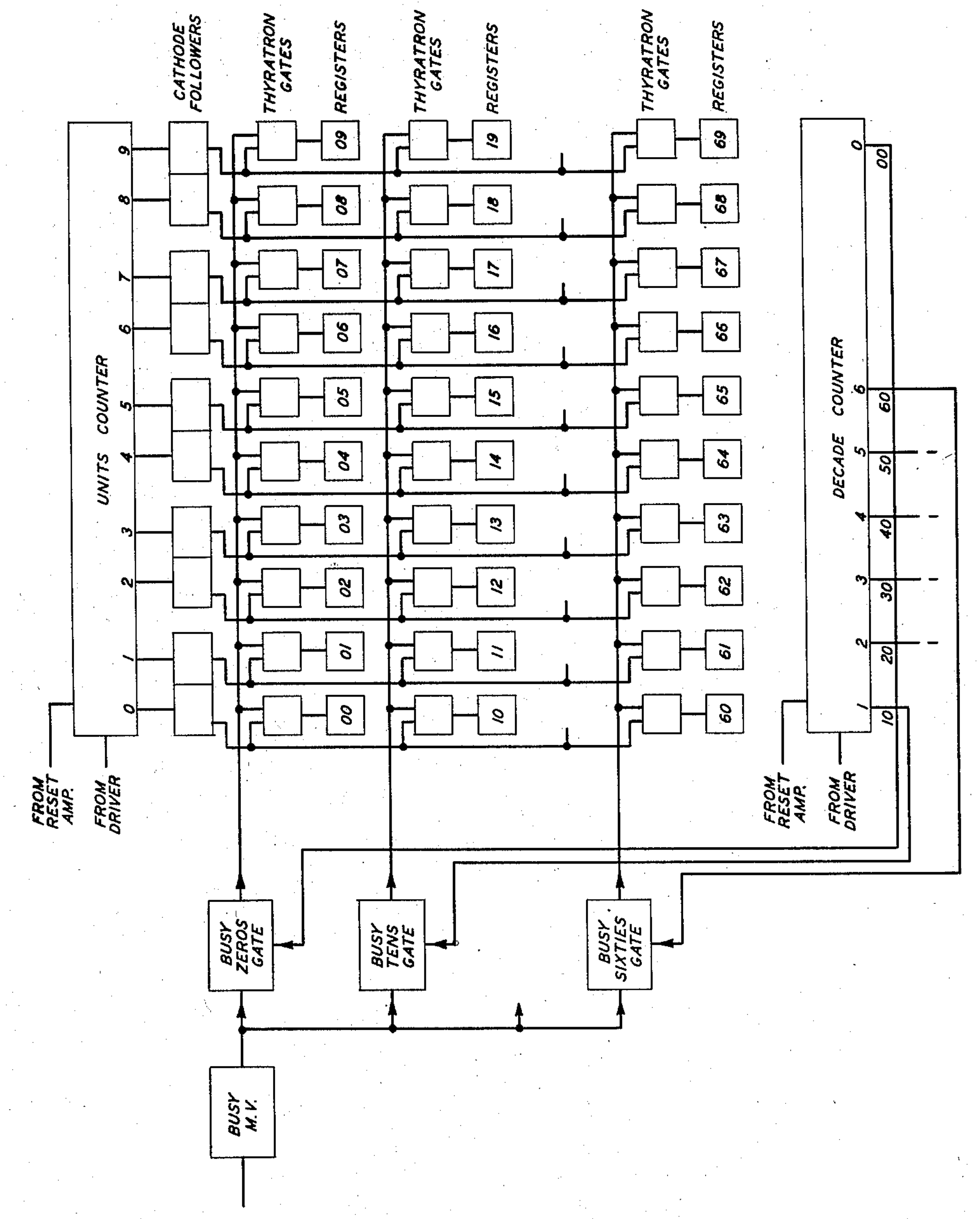

Fig. 6 illustrates how the circuits shown on Figs. 3 and 4 may be modified and expanded so that the recorded data for all seventy lines or trunks can be processed during a single play of the tape. The circuit of Fig. 6 requires seven busy gates, each of which is associated with one of the seven output positions from the decade counter. Three of these gates are shown on Fig. 6 and are designated Busy Zeros Gate, Busy Tens Gate and Busy Sixties Gate. Each of these gates is similar in every respect to gate 265. The grid of each of the busy gates shown on Fig. 6 corresponding to grid 265–2 of tube 265 is connected to the output of the busy multivibrator 253 which is shown diagrammatically on Fig. 6. The grid of each of the busy gates of Fig. 6 corresponding to grid 265–4 is connected to an individual one of the output positions of the decade counter tube. These seven busy gates functionally replace switch 271 of Fig. 2.

The units counter tube has associated therewith seventy thyratron gates and seventy registers instead of ten, as shown on Figs. 3 and 4. The seventy thyratron gates and registers in Fig. 6 are arranged so that each set of ten registers and thyratrons is associated with an individual one of the busy gates and hence, an individual output position of the decade counter tube. The position of the conductive path in the decade counter tube determines which busy gate is enabled and therefore responsive to the busy pulses. Thus, while the decade counter tube is in position 0, any busy places received in coincidence with the first ten scan pulses will open the busy zeros gate and energize one grid of the thyratron gates associated with registers 00 through 09. Each output from the successive cathodes of the units counter tube energizes their associated cathode followers in succession, which causes the particular ones of thyratron gates 00—09 to fire which have busy pulses applied to their other grids at this time by the busy zeros gate.

When the eleventh scan pulse is received, the conductive path in the decade counter tube advances from cathode 0 to cathode 1 thereby enabling the busy tens gates so that the busy pulses representing any of lines ten through nineteen may open the tens gate and fire the thyratrons associated with lines 10 through 19.

The conductive path in the decade counter tube advances one step for every ten scan pulses and in doing so enables the busy gate circuit associated therewith. The operation proceeds in this manner with the units counter advancing one position for each scan pulse and with the decade counter advancing one position for each cycle of the units counter. The decade counter partially enables each of the busy gates in sequence so that they may be open upon the reception of their related busy pulses.

The operation continues in this manner as the following cycles of scanning pulses are received so that at the time the processing of a tape is finished the setting of each register provides a means of ascertaining how many times its related line or trunk was found busy during the interval of time represented by the data on the tape.

Figures 5, 7:
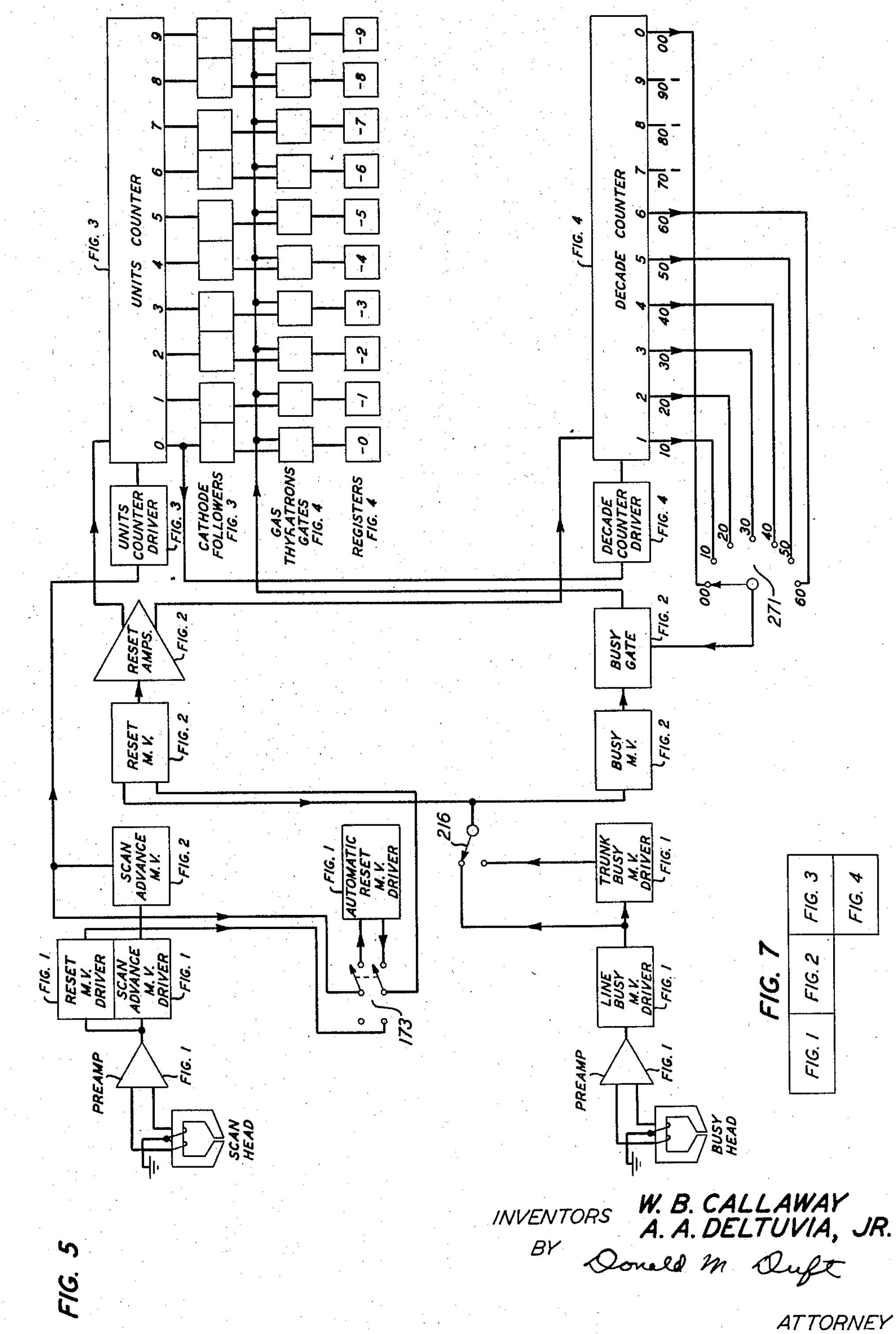

The various circuits of Fig. 6 are shown in block diagram form for purposes of simplicity since each circuit shown thereon is identical in all respects to a related circuit on one of Figs. 3, 4 or 5. Thus, the busy multivibrator of Fig. 6 is identical to the busy multivibrator 253 of Fig. 2. Similarly, the busy gate circuits of Fig. 6 are identical to the busy gate 265 of Fig. 2. Similarly, the units and decade counter tubes, the cathode followers, the thyratron gates, and the registers are all identical to the circuits disclosed in detail on Figs. 3 and 4.

It is to be understood that the above-identified arrangements are but illustrative of the application of the principles of the invention. Numerous other arrangements may be devised by those skilled in the art without departing from the spirit and scope of the invention. For example, the tape reading heads could be dispensed with and the same data could be fed to this circuit by other means, such as telephone lines. Also, the counter tubes disclosed herein could be replaced by any other types of decade counters, such as a relay counting chain. Furthermore, the specific embodiment disclosed herein is shown to have a capacity for analyzing data pertaining to the maximum of seventy trunks. It is to be understood that this showing is only exemplary and that by utilizing the same principles, the circuit could be arranged to receive information pertaining to as many different trunks or other circuits as might be desired.

What is claimed is:

1. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit a busy pulse coincidentally with the reception of a scanning pulse by said first input circuit thereby indicating a busy condition of the unit represented by the coincidentally received scanning pulse, a plurality of registers each of which individually represents one of said units, and means for actuating one of said registers whenever a scanning pulse representing its associated unit is received by said first input circuit coincidentally with the reception of a busy pulse by said second input circuit.

2. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit busy pulses in coincidence with the reception of some of said scanning pulses by said first input circuit thereby indicating a busy condition of the units represented by the coincidentally received scanning pulses, a plurality of registers each of which individually represents one of said units together with its associated scanning pulse in said group, and means responsive to the reception of a group of scanning pulses by said first input circuit for operating the registers representing the scanning pulses received in coincidence with busy pulses.

3. In a data processing system for totalizing the number of times each of a plurality of lines was found busy during a given time interval, a first and a second input circuit, a first magnetic tape reading head for cyclically supplying to said first input circuit a group of scanning pulses, each pulse in said group individually representing one of said lines, a second magnetic tape reading head for supplying to said second input circuit a busy pulse coincidentally with the reception of a scanning pulse by said first input circuit thereby indicating a busy condition of the line represented by the coincidentally received scanning pulse, a plurality of registers each of which individually represents one of said lines, and means for actuating one of said registers whenever a scanning pulse representing its associated line is received by said first input circuit coincidentally with the reception of a busy pulse by said second input circuit.

4. In a data processing system for totalizing the number of times each of a plurality of units was found busy during a given time interval, a first and a second input circuit, a first magnetic tape reading head for cyclically supplying to said first input circuit a group of scanning pulses, each pulse in said group individually representing one of said units, a second magnetic tape reading head for supplying to said second input circuit busy pulses coincidentally with the reception of some of said scanning pulses by said first input circuit to indicate a busy condition of the units represented by the coincidentally received scanning pulses, a plurality of registers each of which individually represents one of said units together with its associated scanning pulse in said group, and means responsive to the reception of a group of scanning pulses for operating the registers associated with scanning pulses received in coincidence with busy pulses.

5. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit a busy pulse coincidentally with the reception of a scanning pulse by said first input circuit thereby indicating a busy condition of the unit represented by the coincidentally received scanning pulse, a plurality of registers each of which individually represents one of said units together with its associated scanning pulse in each group, a distributor responsive to the scanning pulses applied to said first input circuit, and means controlled by said distributor for actuating a register whenever its associated scanning pulse is received by said first input circuit coincidentally with the reception of a busy pulse by said second input circuit.

6. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit busy pulses in coincidence with the reception of some of said scanning pulses by said first input circuit thereby indicating a busy condition of the units represented by said coincidentally received scanning pulses, a plurality of registers each of which individually represents one of said units together with its associated scanning pulse in said group, a distributor responsive to the reception of said scanning pulses, a means controlled by said distributor upon the reception of a group of scanning pulses for actuating the registers associated with scanning pulses received in coincidence with said busy pulses.

7. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit busy pulses in coincidence with the reception of some of said scanning pulses by said first input circuit thereby indicating a busy condition of the units represented by said coincidentally received scanning pulses, a distributor having a plurality of operative positions each of which individually represents one of said units together with its associated scanning pulse in said group, a plurality of registers each of which is individually associated with one of said operative positions together with its related scanning pulse in said group, and means including said distributor operative upon the reception of a group of scanning pulses for actuating the registers associated with scanning pulses received in coincidence with busy pulses.

8. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit a busy pulse coincidentally with the reception of a scanning pulse by said first input circuit thereby indicating a busy condition of the unit represented by the coincidentally received scanning pulse, a distributor having a plurality of operative positions each of which individually represents one of said units, a plurality of registers each of which is individually associated with one of said operative positions and with a scanning pulse in said group, means operative upon the reception of each scanning pulse by said first input circuit to advance said distributor one operative position, and means responsive to the reception of a busy pulse in coincidence with the reception of a scanning pulse for operating the register associated with said coincidentally received scanning pulse.

9. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit a busy pulse coincidentally with the reception of a scanning pulse by said first input circuit thereby indicating a busy condition of the unit represented by the coincidentally received scanning pulse, a units counter having a plurality of output positions, a plurality of registers each of which is individually associated with one of said output positions of said units counter, means responsive to the reception of each scanning pulse for advancing said units counter one position, a decade counter having a plurality of output positions, means for advancing said decade counter one position for every cycle of said units counter, means for applying the output from a selected output position in said decade counter to a gate circuit, means for applying each received busy pulse to said gate circuit, and means including said gate circuit responsive to the coincidental reception of the busy pulse and an output from said decade counter for operating the register associated with the currently operative position of said units counter.

10. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit a busy pulse coincidentally with the reception of a scanning pulse thereby indicating a busy condition of the unit represented by the coincidentally received scanning pulse, a units counter having a plurality of output positions, a plurality of gate circuits each of which is individually associated with one of said output positions of said units counter, a plurality of registers each of which is individually associated with one of said gate circuits, means responsive to the reception of each scanning pulse for advancing said units counter one position, means whereby a first operating potential is applied to one of said gate circuits when said units counter is currently in the output position associated therewith, a decade counter having a plurality of output positions, means for advancing said decade counter one position for every operative cycle of said units counter, means for applying the output from a selected output position of said decade counter to a coincidence circuit, means for applying each received busy pulse to said coincidence circuit, means including said coincidence circuit responsive to the coincidental reception of the busy pulse and an output from said decade counter for applying a second operating potential to all of said gate circuits, and means whereby only the register operates whose gate circuit currently has a first and a second operating potential applied thereto.

11. In a data processing system for totalizing the number of times each of a plurality of units was found busy during a given time interval, a first and a second input circuit, a first magnetic tape reading head for cyclically supplying to said first input circuit a group of scanning pulses, each pulse in said group individually representing one of said units, a second magnetic tape reading head for supplying to said second input circuit a busy pulse coincidentally with the reception of a scanning pulse by said first input circuit thereby indicating a busy condition of the unit represented by the coincidentally received scanning pulse, a distributor having a plurality of operating positions each of which individually represents one of said units, a plurality of registers each of which is associated with a different one of said operative positions, said registers being equal in number to the number of scanning pulses in said group, means operative upon the reception of each scanning pulse by said first input circuit to advance said distributor one position, and means responsive to the reception of a busy pulse in coincidence with a scanning pulse to operate the register for the unit represented by said coincidentally received scanning pulse.

12. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit a busy pulse coincidentally with the reception of a scanning pulse by said first input circuit thereby indicating a busy condition of the unit represented by the coincidentally received scanning pulse, a units counter having a plurality of output positions, a decade counter having a plurality of output positions, a plurality of registers each of which is associated with one of said positions in said units counter and with each position of said units counter having as many registers associated therewith as there are output positions in said decade counter, each of the registers associated with the same position of said units counter being associated with a different position of said decade counter, means responsive to the reception of each scanning pulse for advancing said units counter one output position, means for advancing said decade counter one position for every cycle of said units counter, a plurality of gate circuits, each of which is individually associated with one of said output positions of said decade counter, means for applying the output from each output position of said decade counter to the gate circuit associated therewith, means for applying a busy pulse to all of said gate circuits simultaneously, and means including one of said gate circuits responsive to the simultaneous reception of a busy pulse and an output from the current output position in said decade counter for operating the register that is associated with the current output position of both said units counter and said decade counter.

13. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit a busy pulse coincidentally with the reception of a scanning pulse by said first input circuit thereby indicating a busy condition of the unit represented by the coincidentally received scanning pulse, a units counter having a plurality of output positions, a decade counter having a plurality of output positions, a plurality of registers, one for each of said units and each of which is individually associated with a unique combination comprising a single output position of said units counter and a single output position of said decade counter, a plurality of gate circuits each of which is associated with one of said registers, means responsive to the reception of each scanning pulse for advancing said units counter one output position, means for advancing said decade counter one output position for every cycle of said units counter, a plurality of coincidence circuits, one for each output position of said decade counter, means for applying the output from each output position of said decade counter to the coincidence circuit associated therewith, means for applying a received busy pulse to all of said coincidence circuits simultaneously, means including one of said coincidence circuits responsive to the simultaneous reception of a busy pulse and an output from the current output position in said decade counter for applying an operating potential to the gate circuits of the registers associated with the current output position of said decade counter, and means whereby upon the reception of a busy pulse the one register is operated which is associated with the current output position of said units counter and whose gate circuit currently has an operating potential applied thereto by said last-named coincidence circuit.

14. In a data processing system for totalizing the number of times each of a plurality of units was found busy during a given time interval, a first and a second input circuit, means for cyclically supplying to said first input circuit a group of scanning pulses, each pulse in said group individually representing one of said units, means for supplying to said second input circuit busy pulses coincidentally with the reception of some of said scanning pulses by said first input circuit thereby indicating a busy condition of the units represented by the coincidentally received scanning pulses, a plurality of registers, selection means operable to associate said registers with a selected few of said plurality of units, and means for actuating one of said registers whenever a scanning pulse representing said one register's currently associated unit is received by said first input circuit coincidentally with the reception of a busy pulse by said second input circuit.

15. In a data processing system for totalizing the number of times each of a plurality of units was found busy during a given time interval, a first and a second input circuit, a first magnetic tape reading head for cyclically supplying to said first input circuit a group of scanning pulses, each pulse in said group individually representing one of said units, a second magnetic tape reading head for supplying to said second input circuit a busy pulse in coincidence with the reception of a scanning pulse by said first input circuit thereby indicating a busy condition of the unit represented by the coincidentally received scanning pulse, a plurality of registers, a selection means operable to associate said registers with a selected few of said plurality of units, and means responsive to the reception of a group of scanning pulses by said first input circuit for operating the registers currently associated with the units represented by scanning pulses received in coincidence with a busy pulse.

References Cited in the file of this patent

UNITED STATES PATENTS

| | | |
|---|---|---|
| 2,301,336 | Sigo | Nov. 10, 1942 |
| 2,378,541 | Dimond | June 19, 1945 |
| 2,393,403 | Ostline | Jan. 22, 1946 |